United States Patent Office 3,297,709
Patented Jan. 10, 1967

3,297,709
CERTAIN SUBSTITUTED TETRAZOLE
DERIVATIVES
Martin A. Davis, Montreal, Quebec, Canada, assignor to American Home Products Corporation, New York, N.Y., a corporation of Delaware
No Drawing. Filed Nov. 19, 1965, Ser. No. 508,818
6 Claims. (Cl. 260—308)

The present invention relates to novel chemical compounds having useful biological properties. More particularly, it relates to a group of 5-dibenzocycloheptenyl tetrazoles which are substituted by aminoalkyl sidechains, the compounds being repersented by the following general formula:

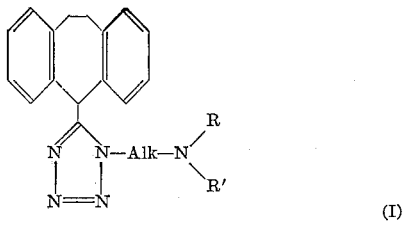

wherein Alk is a lower alkylene radical containing from two to five carbon atoms, such as, for example, ethylene or trimethylene, R and R' represent hydrogen, lower alkyl or aralkyl, or the group NRR' may form part of a heterocyclic radical such as, for example, pyrrolidino, morpholino, piperidino or piperazino.

This invention further relates to the acid addition salts formed from the organic bases of the above-designated structures with pharmaceutically acceptable organic and inorganic acids, such as, for example, citric, maleic, fumaric, oxalic, hydrochloric and phosphoric acids. It also relates to those quaternary ammonium salts derived from the interaction of the organic bases as defined above, with organic esters of inorganic acids such as, for example, methyl bromide, ethyl iodide, or methyl sulfate.

The compounds of the present invention as well as their acid addition salts and quaternary ammonium salts possess important biological properties. They have antibacterial action against a number of microorganisms and are antibacterial agents. In particular the compounds 1-(2 - diethylaminoethyl)-5 - (10,11-dihydro-5H - dibenzo [a,d]cyclohepten - 5 - yl)-1H - tetrazole as the methobromide salt has a high order of antibacterial activity against the microorganisms *Staph. pyogenes* (both penicillin-sensitive and penicillin-resistant strains), *Sarcina lutea*, *Strept. faecalis* and *E. coli*. It also has activity against *A. aerogens*, *S. pullorum*, *Ps. Aeruginosa*, *Pr. mirabilis* and *Pr. vulgaris*. As antibacterial agents the compounds of the present invention, either in base form or as their salts, may be formulated as lotions, creams or ointments containing from 0.1 to 1% of the active ingredient together with suitable excipients. Such lotions, creams or ointments may be advantageously applied topically to infected areas of the skin several times daily.

The compounds of the present invention also possess trichomonicidal activity against *T. vaginalis* and are trichomonicidal agents. As such they may be formulated with suitable excipients in the form of vaginal inserts or vaginal suppositories containing from 40 to 400 mg. of the active ingredient, and may be administered twice daily for periods of time of from two to several weeks.

In addition to the above mentioned anti-infective properties the compounds of the present invention also elicit effects on the autonomic nervous system of mammals. The effects resemble in part those elicited by the widely used antispasmodic drugs such as, for example, atropine. Thus they cause significant reductions in gastric motility, indicating their use in the treatment of gastrointestinal disorders. At the same time they have protective actions against the effects of histamine, acetylcholine and 5-hydroxytryptamine. The compound 1 - (3-dimethylaminopropyl) - 5-(10,11-dihydro-5H - dibenzo[a,d]cyclohepten - 5-yl)-1H-tetrazole, as the oxalate salt, has a remarkably high activity as antagonist of 5 - hydroxytryptamine.

The compounds of the present invention, in base form, are prepared by the interaction of a 5-(5H-dibenzocyclohepten-5-yl)-1H-tetrazole with a substituted aminoalkyl halide of the formula

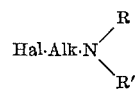

where Hal represents a halogen, perferably chlorine, and Alk and R, R' are defined above. To effect the interaction, an alkaline condensing agent is employed. In practice it is convenient to use an alkali metal alkoxide, such as, for example, sodium methoxide and to carry out the reaction in a lower alkanol solvent, preferably anhydrous ethanol. The product may be isolated in a conventional manner and converted to a suitable acid addition or quaternary ammonium salt. The starting material, a tetrazole, may be obtained by the interaction of a 5H-dibenzocyclohepten-5 - carbonitrile with sodium azide and ammonium chloride in dimethylformamide at an elevated temperature, according to the general procedure described by W. G. Finnegan et al., in J. Am. Chem. Soc., 80, 3908 (1958). The following formulae and descriptive examples will illustrate my invention.

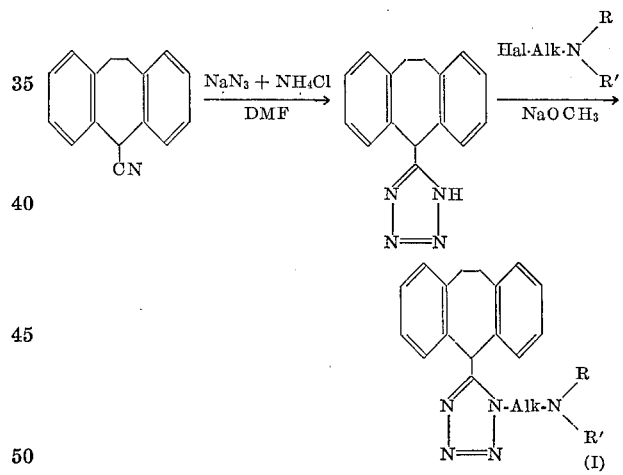

Example 1

A mixture of 10,11-dihydro-5H-dibenzo[a,d]cycloheptene-5-carbonitrile (87.6 g., 0.4 mole), prepared as described by M. A. Davis et al. in J. Med. Chem., vol. 6, p. 51 (1963), sodium azide (30 g., 0.44 mole) and ammonium chloride (30 g.) is heated and stirred at 125° for 30 hours in dimethylformamide (200 ml.). The mixture is filtered and the filtrate concentrated to about ¼ of its original volume under reduced pressure. Cold water (500 ml.) is added to the residue and the yellow precipitate washed with ice-cold ethanol (150 ml.) then dried in vacuo to give a solid, M.P. 257–262° C. When recrystallized from a dimethylformamide-water mixture (3:1), the resulting 5-(10,11-dihydro-5H-dibenzo[a,d] cyclohepten-5-yl)-1H-tetrazole has M.P. 264–265° C. (dec.), and its composition is confirmed by elemental analysis.

Example 2

To a solution of sodium methoxide (2.5 g., 0.047 mole) and the tetrazole obtained in Example 1 (12.2 g., 0.047 mole) in absolute ethanol (125 ml.) is added gradually under constant stirring 2-diethylaminoethyl chloride (7.85 g., 0.058 mole). The mixture is then stirred for an additional 2 hours during which time a white precipitate forms. The solution is filtered and the solvent removed in vacuo leaving an oil which is taken up in dilute hydrochloric acid and filtered. The filtrate is made alkaline and extracted into benzene. The organic layer is dried over sodium sulfate and the solvent removed in vacuo, leaving 1-2-diethylaminoethyl) - 5 - (10,11-dihydro-5H-dibenzo[a,d]cyclohepten-5-yl)-1H-tetrazole as a pale yellow oil which is converted to the hydrochloride salt with M.P. 196–208° C. Recrystallization from methanol-ether yields 1-(2-diethylaminoethyl) - 5 - (10,11-dihydro-5H-dibenzo[a,d]cyclohepten-5-yl)-1H-tetrazole hydrochloride, M.P. 232–234° C., and its composition is confirmed by elemental analysis.

*Example 3*

Methyl bromide in acetone is added to the free base (6.4 g., 0.018 mole), obtained as in Example 2, and dissolved in the same solvent. Addition of a little anhydrous ether precipitates 1-(2-diethylaminoethyl)-5-(10,11-dihydro - 5H -dibenzo[a,d]-cyclohepten-5-yl)-1H-tetrazole methobromide, as white needles, with M.P. 217–218° C. (dec.), after recrystallization from ethanol-ether. Elemental analysis confirms the composition of the above compound.

*Example 4*

To a solution of sodium methoxide (3.8 g., 0.07 mole) and the tetrazole obtained in Example 1 (18.2 g., 0.07 mole) in absolute ethanol (150 ml.) is added gradually with stirring 3-dimethylaminopropyl chloride (10.5 g., 0.098 mole). The mixture is then stirred for a further 2 hours, heated briefly under reflux and worked up as indicated in Example 2. The free base 1-(3-dimethylaminopropyl) - 5 - (10,11-dihydro-5H-dibenzo[a,d]cyclohepten-5-yl)-1H-tetrazole is obtained as a clear yellow oil, which is converted to the oxalate salt. After recrystallization of the crude salt from methanol-ether, 1-(3-dimethylaminopropyl)-5-(10,11 - dihydro-5H-dibenzo[a,d]cyclohepten-5-yl)-1H-tetrazole oxalate is obtained with M.P. 189–191° C., and its composition is confirmed by elemental analysis.

I claim:
1. A member selected from the group consisting of 1-(2-diethylaminoethyl) - 5 - (10,11-dihydro-5H-dibenzo[a,d]-cyclohepten-5-yl)-1H-tetrazole and the pharmaceutically acceptable acid addition salts thereof.
2. A member selected from the group consisting of 1-(3-dimethylaminopropyl)-5-(10,11-dihydro-5H-dibenzo[a,d]-cyclohepten-5-yl)-1H-tetrazole and the pharmaceutically acceptable acid addition salts thereof.
3. 1-(2-diethylaminoethyl) - 5 - (10,11-dihydro-5H-dibenzo [a,d]-cyclohepten-5-yl)-1H-tetrazole hydrochloride as claimed in claim 1.
4. 1-(2-diethylaminoethyl) - 5 - (10,11-dihydro-5H-dibenzo[a,d] - cyclohepten - 5 - yl) - 1H - tetrazole methobromide.
5. 1-(3-dimethylaminopropyl)-5-(10,11 - dihydro - 5H-dibenzo[a,d]-cyclohepten-5-yl)-1H-tetrozole oxalate.
6. 5-(10,11-dihydro-5H-dibenzo[a,d]cyclohepten-5-yl)-1H-tetrazole.

References Cited by the Examiner

UNITED STATES PATENTS 3,055,911  9/1962  Finnegan et al. _____ 260—308.4

OTHER REFERENCES

Wagner et al.: Synthetic Organic Chemistry (New York, 1953), pages 666–670.

ALEX MAZEL, *Primary Examiner.*

HENRY R. JILES, *Examiner.*

A. D. ROLLINS, *Assistant Examiner.*